United States Patent
Fujimoto

Patent Number: 5,487,928
Date of Patent: Jan. 30, 1996

[54] FIBER REINFORCED COMPOSITE MATERIAL AND A PROCESS FOR THE PRODUCTION THEREOF

[75] Inventor: Jun Fujimoto, Tokyo, Japan

[73] Assignee: NEC Corporation, Tokyo, Japan

[21] Appl. No.: 905,222

[22] Filed: Jun. 29, 1992

Related U.S. Application Data

[63] Continuation of Ser. No. 454,266, Dec. 21, 1989, abandoned.

[30] Foreign Application Priority Data

Dec. 22, 1988 [JP] Japan .................................. 63-325217
Dec. 22, 1988 [JP] Japan .................................. 63-325218

[51] Int. Cl.⁶ .................... B37B 15/08; B37B 27/38; B37B 27/06
[52] U.S. Cl. .......... 428/36.4; 428/224; 428/246; 428/248; 428/285; 428/286; 428/288; 428/295; 428/408; 428/902
[58] Field of Search .................... 428/414, 246, 428/298, 224, 286, 288, 295, 408, 902, 36.4

[56] References Cited

U.S. PATENT DOCUMENTS 3,847,726  11/1974  Becker et al. .................... 161/186
4,604,319  8/1986  Evans et al. .................... 428/414

OTHER PUBLICATIONS

Takesada Sasaki et al., "Composites for Noise and Vibration Control-High Damping Composite Steel Sheet"; Transactions ISU, vol. 19, 1979.

Primary Examiner—Patrick J. Ryan
Assistant Examiner—Richard Weisberger
Attorney, Agent, or Firm—Leydig, Voit & Mayer

[57] ABSTRACT

A fiber reinforced composite material is provided. This comprises at least three layers of:
(a) at least two layers of composite materials and
(b) at least one layer of viscoelastic material.

Each of the layers (a) has undirectionally aligned reinforcing fibers impregnated in a matrix resin. Preferably, at least one pair of the layers (a) has orientation angles of the fibers different from each other. Between such pair of the layers (a), the layer (b) is sandwiched.

Such fiber reinforced composite material has a large vibration damping property.

5 Claims, 4 Drawing Sheets

FIBER REINFORCED COMPOSITE MATERIAL AND A PROCESS FOR THE PRODUCTION THEREOF

This application is a continuation of application Ser. No. 07/454,266, filed Dec. 21, 1989, now abandoned.

BACKGROUND OF THE INVENTION

1. Field of the Invention

The present invention relates to a fiber reinforced composite material which is effective to reduce vibration and noise when used for a construction body such as a space construction equipment, for example, an artificial satellite, an office automation machine and device, and automobile, a leisure article or the like; and also a process for the production thereof.

2. Description of the Prior Art

Fiber reinforced composite materials are those comprising inorganic fibers such as carbon fibers or glass fibers or organic fibers such as aramid (-aromatic polyamide) fibers integrally combined with a matrix resin such as an epoxy resin, a polyimide resin or a polyether-ether ketone resin.

Such fiber reinforced composite materials, when compared with conventional metal construction materials, have advantages of light weight and high strength and also an advantage that any desired mechanical properties can be obtained by appropriately controlling orientation angles of the fibers. Therefore, the fiber reinforced composite materials tend to be widely used for construction materials particularly for those requiring light weight, such as a space construction equipment, an aircraft, an automobile, a leisure article or the like.

As the use of such composite materials have been broadened, there occurs a problem of vibration.

Since the fiber reinforced composite materials are lightweight and have a small vibration damping property (of loss factor $\eta=0.001$–$0.01$) to an extent similar to that of conventional metal construction materials, they are liable to vibrate. Further, they are often used for molding a construction body as a whole and so it is impossible to rely upon any vibration damping by friction at connecting portions (constructional damping) differently from conventional metal construction materials. Therefore, in a space construction equipment such as an artificial satellite, problems of troubles of loaded apparatus and lowering of precision of antenna positions occur owing to the vibration of the construction body. It is thus very important to improve the vibration damping property of fiber reinforced composite materials.

Bill Carroll reported, in 33rd International SAMPE Symposium Mar. 7–10, 1988, improved toughness of carbon fiber composites via the use of thermoplastic interplies. In such construction, however, a thermoplastic sheet having a high Young's modulus and a low vibration damping property at a room temperature is sandwiched between carbon fiber reinforced composite material layers, and so it is expected that the toughness will be improved but it is not expected that any vibration damping properties can be improved.

Takesada Sasaki proposed, in Transactions, ISIS, Vol. 19 (1979), pages 569–577, composites for noise and vibration control-high damping composite steel sheet. In such constitution, a viscoelastic polymer layer is sandwiched between two steel sheets. However, since steel sheets have no anisotropic property, the vibration damping property can be improved only in flexural vibration, but not in stretching vibration.

It is possible to increase vibration damping of a composite material by incorporating a flexibility-attaching agent such as polyethylene glycol, polypropylene glycol or liquid rubber into a matrix resin of the composite material. The vibration damping property of the matrix resin itself can be much improved by such agent, but that of the composite material in its entirety can be only slightly improved by such agent. Further, the stiffness of the composite material is considerably decreased, by such agent. The use of the flexibility-attaching agent therefore, is not effective.

SUMMARY OF THE INVENTION

An object of the present invention is therefore to present a fiber reinforced composite material having a large vibration damping property and a process for the production thereof.

The present invention thus provides a fiber reinforced composite material, including at least three integrally laminated layers comprising (a) at least two layers of a composite material containing inorganic reinforcing fibers such as carbon fibers or glass fibers or organic reinforcing fibers such as aramid fibers unidirectionally aligned and impregnated in a matrix resin such as an epoxy resin and (b) at least one layer of a viscoelastic material layer sandwiched between the layers (a) of the composite material. Preferably, the layers (a) of the composite material are laminated so that orientation angles of the fibers are different between at least one pair of adjacent layers, and the layer (b) of the viscoelastic material is sandwiched between each of or a part of said at least one pair of adjacent layers having different orientation angles of the fibers.

The above fiber reinforced composite material can be produced by (i) preparing composite sheets by impregnating unidirectionally aligned reinforcing fibers in a matrix resin, (ii) laminating a plurality of the obtained composite sheets so as to sandwich a viscoelastic material therebetween and (iii) solidifying the laminated product into an integral fiber reinforced composite material.

The viscoelastic material may be laminated between the composite sheets either (i) as a sheet like material which has been semi-hardened or hardened, or (ii) by means of prepreg sheets which have been prepared by coating the composite sheets with the viscoelastic material and semi-hardening or hardening the viscoelastic material as coated.

The viscoelastic material, is preferably laminated in a semi-hardened or hardened condition, since if it is used in a non-hardened condition there may occur mixing of the same with the matrix resin of the composite sheets whereby it becomes difficult to obtain the characteristics sought in the final hardened laminates and particularly to keep the thickness of the viscoelastic material layer, that is, the vibration control layer, constant.

Thus the present invention also provides a process for the production of the fiber reinforced composite material and the prepreg sheet used therein as above.

In general, when flexural vibration is applied to a unidirectionally fiber-reinforced composite material, the vibration damping property $\eta_c$ may be represented by the following formula:

$$\eta_c = \frac{\eta_m(1-v_f) - \frac{E_f}{E_m} \cdot \eta_f \cdot v_f}{1 - v_f + \frac{E_f}{E_m} \cdot v_f} \tag{1}$$

[wherein $\eta_m$ is the vibration dumping property (=loss factor) of the matrix resin, $E_m$ is the modulus of elasticity of the matrix resin, $\eta_f$ is the vibration damping property of the fibers, $E_f$ is the modulus of elasticity of the fibers and $V_f$ is the volumetric content ratio of the fibers]

For example, a case wherein carbon fibers are loaded in an amount of 50 volume % is assumed. The modulus of elasticity of a resin is to an extent of 200 Kg/mm$^2$ and so the ratio of the moduli of elasticity $E_f/E_m$ is approximately 100. Therefore in this case, the formula (1) may be reformulated as follows:

$$\eta_c = \frac{\eta_m + 100\eta_f}{101} = \frac{\eta_m}{100} + \eta_f \tag{2}$$

Ordinarily, the vibration damping property of a resin $\eta_m$ is not larger than 0.01 and that of carbon fibers $\eta_f$ is to an extent of 0.002, and so $\eta_c$ is to an extent of 0.002 according to the formula (2). It is also understood from the formula (2) that no appreciable increase of $\eta_c$ can be expected simply by increasing $\eta_m$ of the resin by attaching flexibility thereto.

In the composite material of the present invention, a viscoelastic material is sandwiched between layers having different orientation angles of fibers. Accordingly, when the composite material is subjected to stretching deformation, the respective layers are deformed to different conditions owing to their anisotropy and so the viscoelastic material between these layers is subjected to shear deformation. The viscoelastic material in general has a large viscosity and thus a portion of vibration energy is converted to thermal energy by said shear deformation and absorbed. For this, the vibration damping property is increased. The vibration damping property depends upon an efficiency of converting vibration energy into thermal energy (mechanical loss tan δ) of the viscoelastic material. Therefore, by selecting a viscoelastic material of large tan δ at a low frequency, it is possible to obtain a large vibration damping property at a low frequency.

In general, the viscoelastic material is one that has a range where Young's modulus rapidly decreases and also a peak of the vibration damping property, at room temperature. Examples of such viscoelastic material are a polyurethane resin obtainable by the reaction of a polyol resin with a polyisocyanate compound, and a polyolefin resin such as polyethylene and polypropylene, and an epoxy resin comprising polyglycidyl ether of polyol or its polymer.

It is possible to give a multilayer vibration control construction to the composite material of the present invention and also control the vibration damping property and the stiffness by appropriately modifying the positions where the viscoelastic material is placed. Further it is possible to improve temperature dependency of the vibration damping property by using viscoelastic materials of different glass transition temperatures.

When the composite material of the present invention is subjected to flexural deformation, a vibration control mechanism of the constrained type similar to the vibration controlled steel plates, as mentioned above, occurs and so a large vibration damping property at a high frequency is obtained.

The viscoelastic material may be or may not be placed between layers of same orientation angles of fibers, if any. If the viscoelastic material is placed only between such layers, however, only the vibration control mechanism of the constrained type similar to said steel plates occurs and so no large vibration damping property under stretching deformation can be expected.

DESCRIPTION OF THE PREFERRED EMBODIMENTS

The present invention will be explained below further in detail with respect to its some embodiments.

Figure 1:
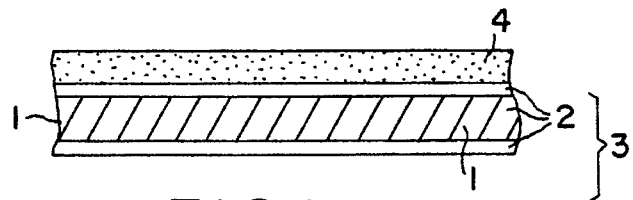
FIG. 1 shows a cross section of a prepreg sheet which is used to produce a fiber reinforced composite material as an embodiment of the present invention.

Referring to FIG. 1, by impregnating unidirectionally oriented carbon fibers 1 with an epoxy resin 2, a composite material layer 3 is formed and the epoxy resin is subjected to a semi-hardening treatment. Such product may be obtained from Sumitomo Chemical Co. Ltd., Japan under trade name of AS/J1201. Then a non-hardened viscoelastic material is coated on one surface of the composite material layer and semi-hardened or hardened to form a prepreg sheet having a viscoelastic material layer 4. The viscoelastic material used is prepared by thoroughly mixing at room temperature 100 g of 1,6-hexanediol diglycidyl ether having an epoxy equivalent 150 g/equiv. with 100 g of a condensate of xylene with formaldehyde (average molecular weight 400, liquid at 25° C., and viscosity of 750 cps/50° C.) and 100 g of a curing agent obtained by adding 1 part by weight of 2,4,6-tris(dimethylaminomethyl)_phenol to 100 parts by weight of 4-methyl-1,2,3,6-tetrahydrophthalic anhydride. This viscoelastic material shows, after hardening, tan $\delta_{max}$= 2.0 at a room temperature.

Figure 2:
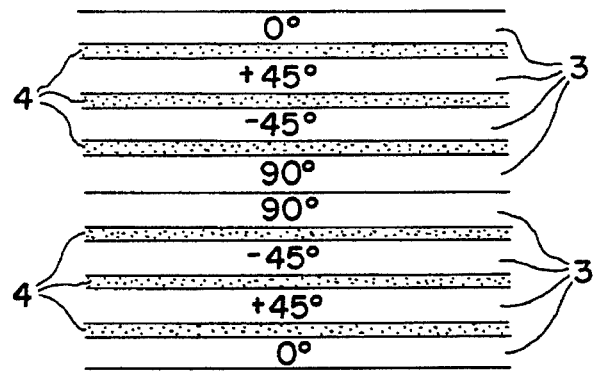
FIG. 2 shows a cross section of an embodiment of a fiber reinforced composite material produced by using the prepreg sheet shown in FIG. 1.

By laminating the prepreg sheets as prepared above, or separately prepared sheets of the composite material layers 3 and the viscoelastic material layers 4, with changes of the orientation angles of the fibers in the composite material layers 3, by 0°, +45°, –45°, 90°, 90°, –45°, +45° and 0°, a multilayer construction sheet having eight composite material layers 3 and six viscoelastic material layers 4 as shown in FIG. 2 is produced. This multilayer construction sheet is heated under pressure in an autoclave or a heat press for hardening.

Figure 3:
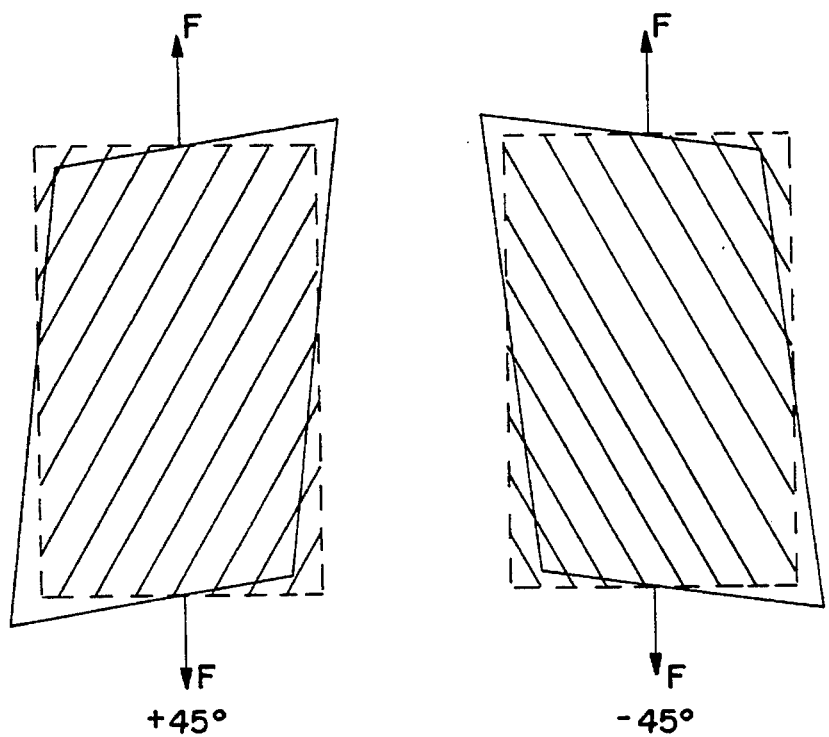
FIG. 3 shows deformation of a monolayer composite material when a tensile stress is applied thereto in an angle of +45° or –45° to unidirectionally oriented fibers in the material.

In FIG. 3, deformation of a monolayer plate such as one of the composite material layers 3 in FIG. 2 when a tensile stress is applied thereto from +45° or −45° to the direction of fibers contained in the plate is schematically illustrated. The viscoelastic material layers 4 in FIG. 2 sandwiched between the adjacent composite material layers 3 which are different as to their orientation angles of fibers for +45° or −45° operates to constrain such deformation by their shear deformation.

Figure 4:
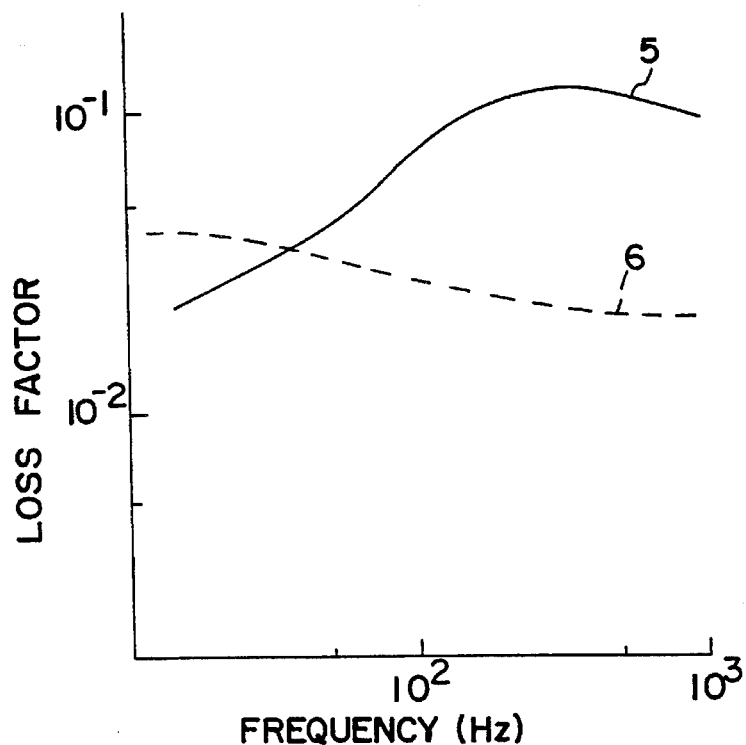
FIG. 4 illustrates frequency characteristic curves of loss factors of the composite material of the embodiment shown in FIG. 2.

In FIG. 4, the relationship between loss factors and frequencies obtained by the fiber reinforced composite material of the embodiment shown in FIG. 2 is shown. In FIG. 4, the full line 5 represents a characteristic curve of flexural vibration and the broken line 6 represents a characteristic curve of longitudinal vibration. In either of the curves, the loss factors have large values of not less than 0.02.

Figure 5:
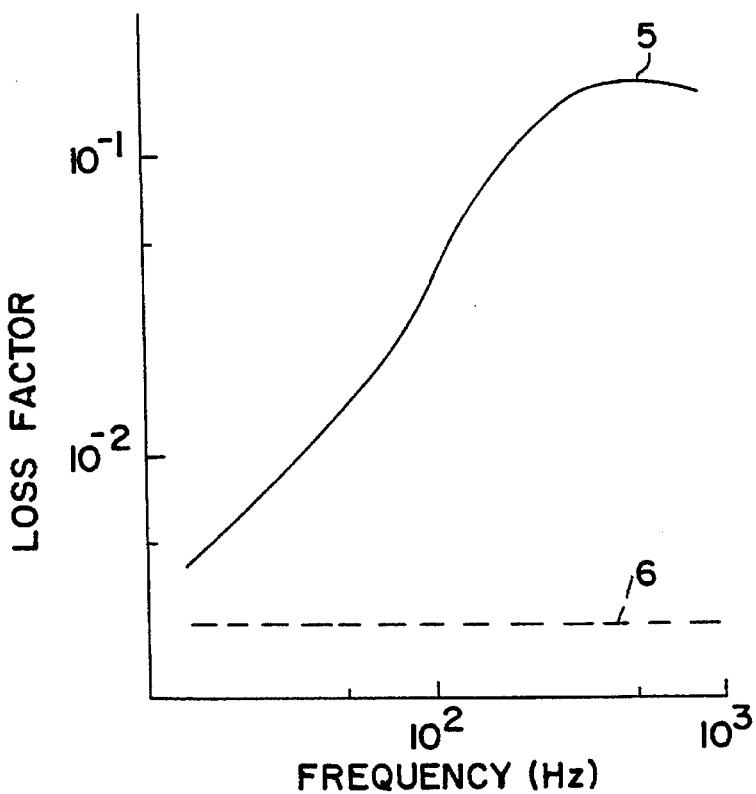
FIG. 5 illustrates frequency characteristic curves of loss factors of a composite material similar to the embodiment shown in FIG. 2 but different from the same at the point that the viscoelastic material is provided only between two adjacent layers having the same orientation angle of fibers.

On the other hand, FIG. 5 shows the relationship between loss factors and frequencies obtained when the viscoelastic material is provided only between the adjacent composite material layers 3 both having the same 90° orientation angle of the fibers. It is shown that the loss factors in both of the longitudinal and flexural vibrations are decreased in frequencies of not larger than 100 Hz compared with FIG. 4.

It is to be noted however this does not mean that the viscoelastic material should not be provided between layers having the same orientation angle of the fibers. The viscoelastic material may additionally and, as the case may be, preferably be provided between such layers, for examble, two center 90° layers in FIG. 2 to obtain some additional effect.

Figure 6:
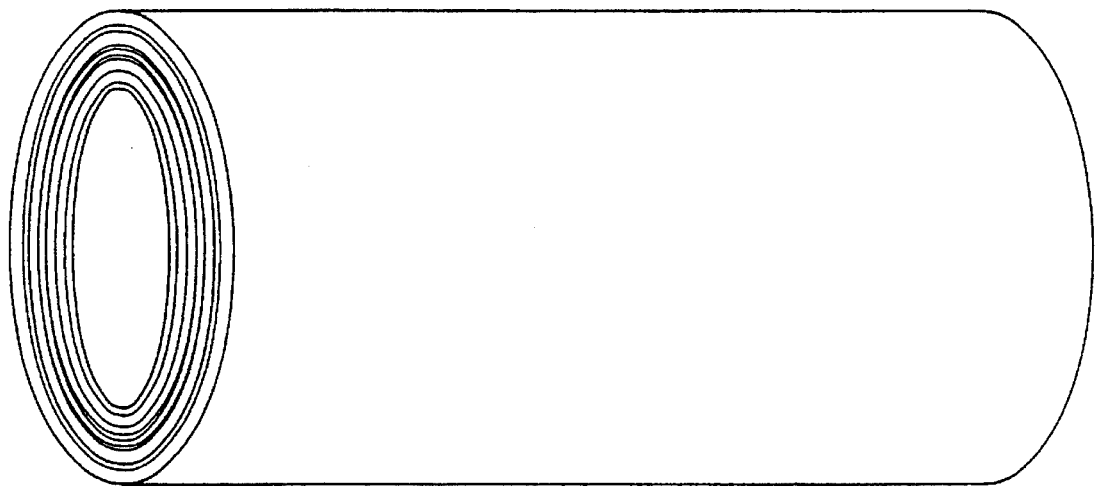
FIG. 6 shows a perspective view of another embodiment of the composite material of the present invention made up into a pipe construction body.
Figure 7:
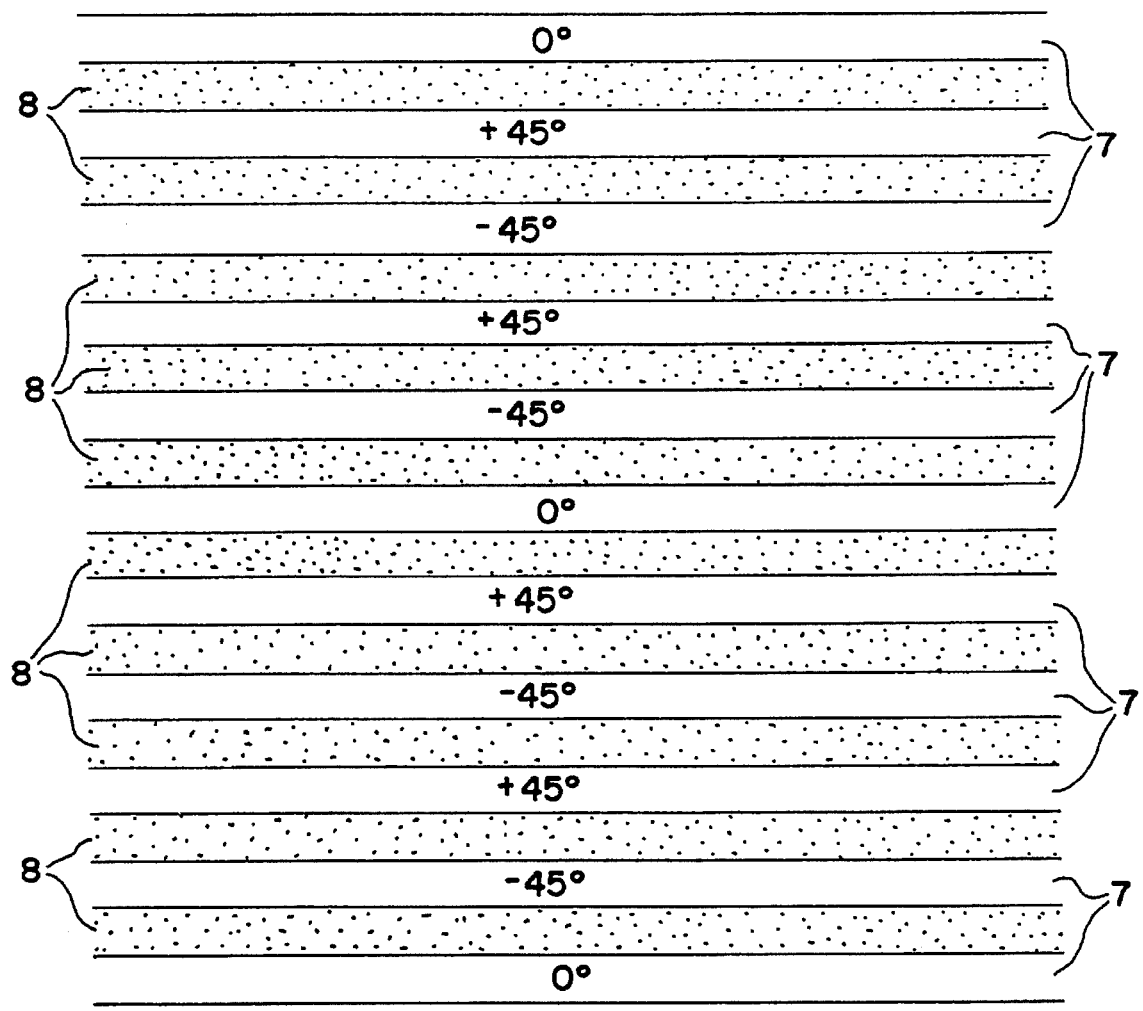
FIG. 7 shows schematic illustration of the laminate constitution of the composite material of FIG. 6.

FIGS. 6 and 7 show another embodiment of the present invention. In this embodiment, a pipe construction body as shown in FIG. 6 is made of a laminate constitution as shown in FIG. 7. The laminate constitution is prepared by laminating eleven composite material layers 7 oriented to angles of 0°, −45°, +45°, −45°, +45°, 0°, −45°, +45°, −45°, +45° and 0°, respectively and ten viscoelastic material layers 8, and hardening in an autoclave. The composite material 7 used is a product obtained by impregnating carbon fibers in an epoxy resin and is sold by Toray Ind. Inc. under the trade name of M40/#2500. The viscoelastic material 8 used is a polyolefin resin sold by Mitsui Petrochemical Ind. Ltd. under trade name of SDF-R2 which shows tan δ=0.9 at a room temperature (measured at 96 Hz).

Figure 8:
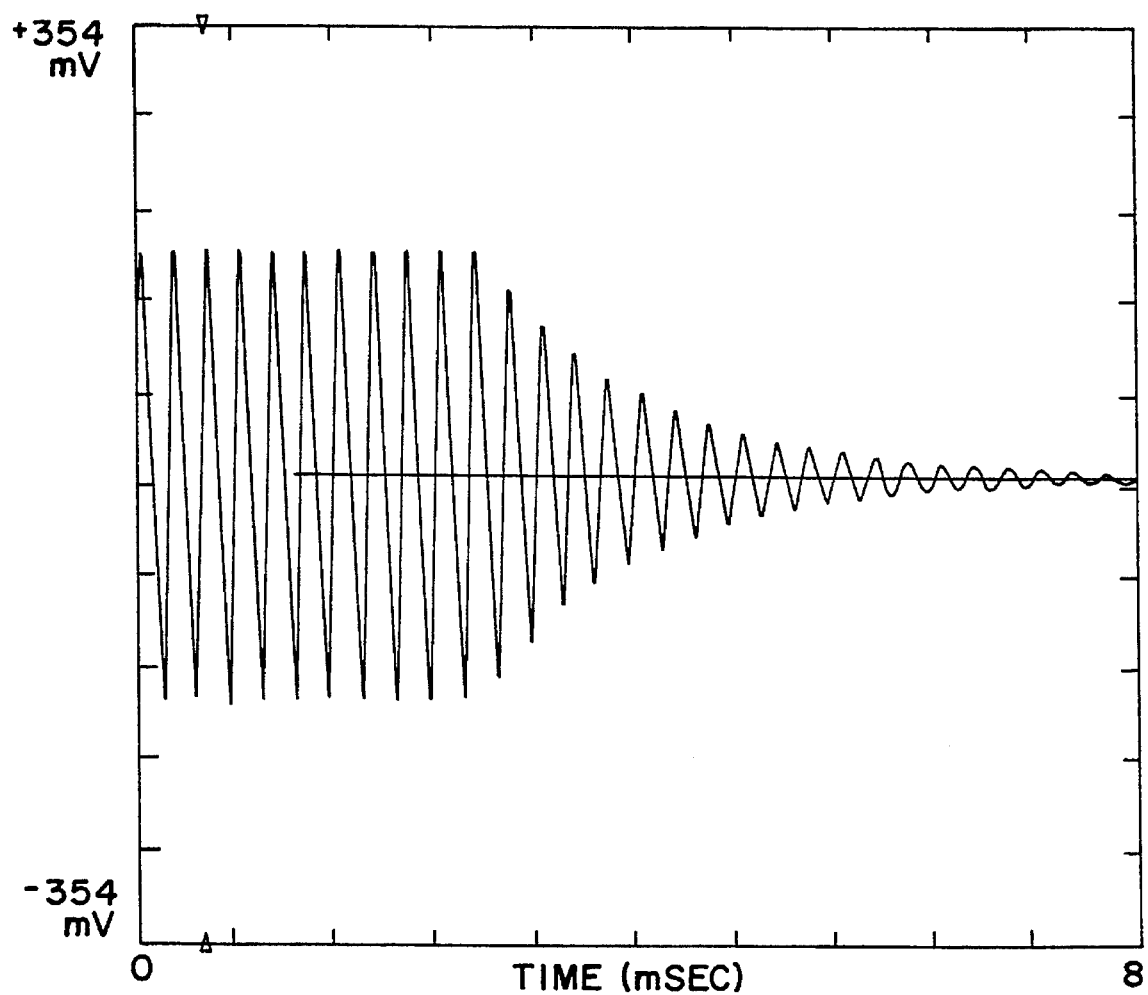
FIG. 8 illustrates a vibration damping waveform when a stretching vibration is applied to the pipe construction body of FIG. 6.

FIG. 8 shows a vibration damping waveform (primary mode) obtained by applying a stretching vibration to the pipe construction body of FIG. 6. The loss factor calculated from this waveform amounts to a high value of 0.06.

In the above embodiments, carbon fibers are used as the reinforcing fibers. It is however also possible to use inorganic fibers such as glass fibers or organic fibers such as aramid fibers and obtain similar effects.

As explained in detail as above, the present invention has enabled to present a fiber reinforced composite material having a large vibration damping property, which is very useful to solve the problems of troubles of loaded apparatus and lowering of precision of antenna positions in a space construction equipment such as an artificial satellite, and noises in an automobile.

I claim:

1. A prepreg sheet comprising (i) a layer of a composite material for damping vibration prepared by impregnating unidirectionally aligned reinforcing fibers in a matrix resin and semi-hardening the base resin and (ii) a coating thereon of a viscoelastic damping material in a semi-hardened or hardened condition, said viscoelastic damping material having a low Young's modulus with high vibration damping, at room temperature.

2. A prepreg sheet according to claim 1 where the viscoelastic material is selected from the group consisting of polyurethanes, polyolefins, and epoxy resins.

3. A prepreg sheet according to claim 2 further including a curing agent.

4. A prepreg sheet according to claim 1 wherein the viscoelastic material is formed from 1,6 hexanediol diglycidyl ether and a xylene-formaldehyde condensate.

5. A prepreg sheet according to claim 1 wherein the viscoelastic material is polyethylene or polypropylene.

* * * * *

UNITED STATES PATENT AND TRADEMARK OFFICE
CERTIFICATE OF CORRECTION

PATENT NO. : 5,487,928
DATED : January 30, 1996
INVENTOR(S) : Fujimoto

It is certified that error appears in the above-identified patent and that said Letters Patent is hereby corrected as shown below: Title page:

Item: 57; delete "abstract in its entirety" and insert the following:

--A prepreg sheet is provided which includes a layer of a composite material for damping vibration prepared by impregnating unidirectionally aligned reinforcing fibers in a matrix resin and semi-hardening the base resin and a coating thereon of a viscoelastic damping material in a semi-hardened or hardened condition, the viscoelastic damping material having a low Young's modulus with high vibration, at room temperature--.

Signed and Sealed this

Sixteenth Day of July, 1996

*Attest:*

BRUCE LEHMAN

*Attesting Officer*     Commissioner of Patents and Trademarks